United States Patent [19]

Castanis

[11] 4,195,561
[45] Apr. 1, 1980

[54] YOGURT MAKER

[76] Inventor: George Castanis, 444 6th Ave., New York, N.Y. 10011

[21] Appl. No.: 968,181

[22] Filed: Dec. 11, 1978

[51] Int. Cl.² .............................................. A23C 9/12
[52] U.S. Cl. .................................. 99/455; 215/13 R; 116/216; 426/61; 99/453; 99/493; 99/536
[58] Field of Search ................ 99/452, 453, 455, 483, 99/493, 536; 426/61, 43; 73/356; 116/308, 335, 216, DIG. 41; D7/77; 215/13 R, 230, 365, 11 A

[56] References Cited

U.S. PATENT DOCUMENTS

| | | | |
|---|---|---|---|
| 2,953,921 | 9/1960 | Muncheryan | 116/216 |
| 3,750,819 | 8/1973 | Wilson | 215/13 R |
| 3,752,347 | 8/1973 | Bell | 215/13 R |
| 3,818,858 | 6/1974 | Kramer et al. | 215/230 |
| 4,009,368 | 2/1977 | Faiure et al. | 99/453 |
| 4,022,914 | 5/1977 | Moody | 99/453 |
| 4,066,794 | 1/1978 | Schur | 426/61 |
| 4,132,464 | 1/1979 | Maeno | 73/356 |

*Primary Examiner*—Harvey C. Hornsby
*Assistant Examiner*—Timothy F. Simone
*Attorney, Agent, or Firm*—Michael Ebert

[57] ABSTRACT

A yogurt maker which requires only hot tap water at the proper temperature and a yogurt preparation to produce a natural yogurt without the need for an external heat source to promote incubation. The maker is constituted by a can which houses a Dewar flask, the can having a removable cover provided with a chromatic liquid crystal cell that serves to test the hot tap water to be sure that it is at the correct temperature before it is poured into the flask to be mixed with the yogurt preparation. The hot water mixture is maintained by the flask at the incubation temperature for a period indicated by a scale on the cover, which scale is settable relative to start and stop points on the can. Upon completion of incubation, the flask containing the yogurt is withdrawn from the can and refrigerated.

9 Claims, 8 Drawing Figures

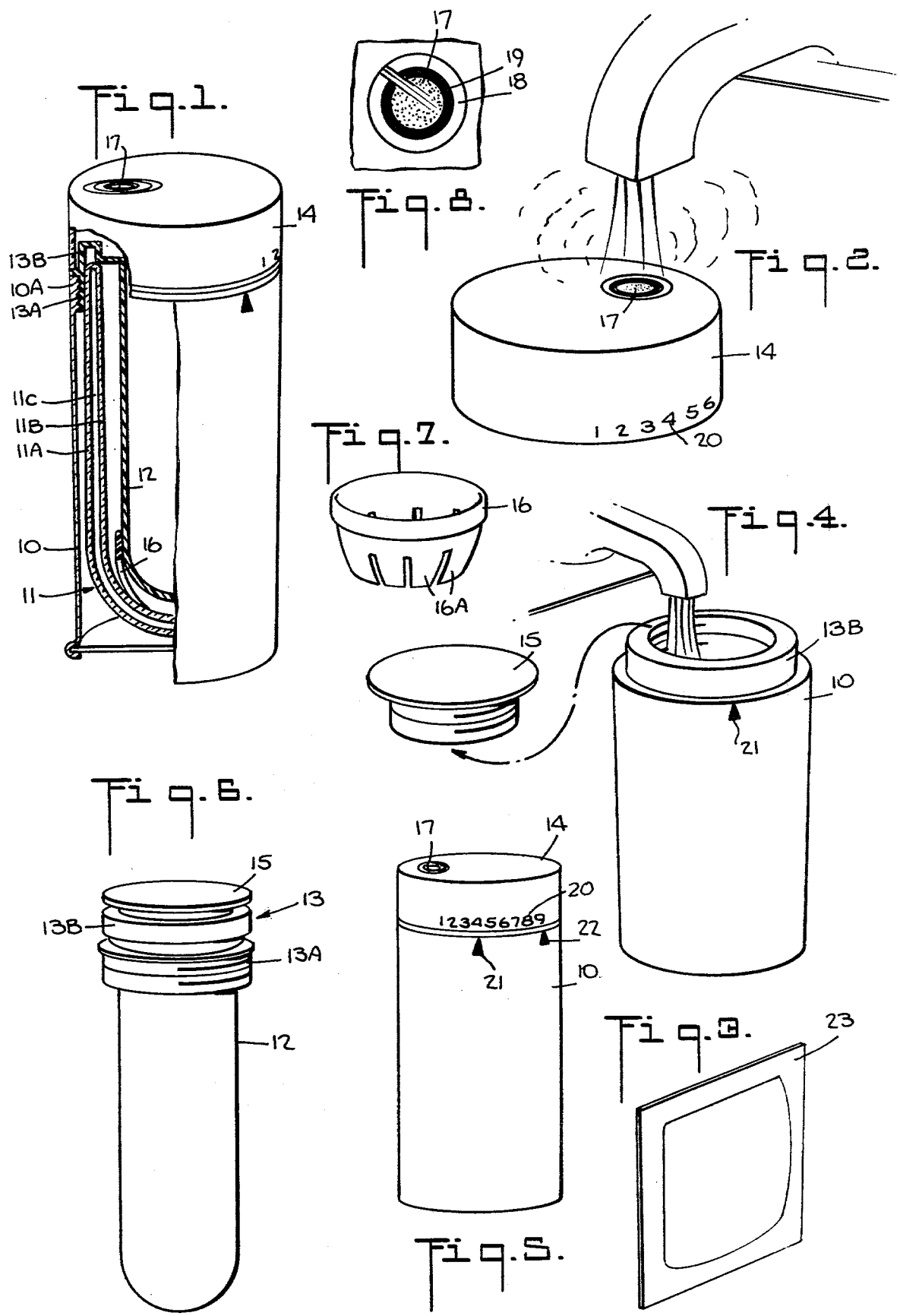

YOGURT MAKER

BACKGROUND OF INVENTION

This invention relates generally to the preparation of natural yogurt, and more particularly to a yogurt maker adapted to receive a yogurt preparation and hot tap water at the proper temperature to produce a latent yogurt mixture which is maintained at an incubation temperature without external heat until the desired product is developed.

Yogurt is a form of fermented milk curdled to a smooth, creamy consistency by lactic acid producing micro-organisms. The preparation of natural yogurt entails the implant of a beneficial culture of *Lactobacillus bulgaricus* in milk which is then allowed to incubate until these bacilli establish the proper pH in the milk, after which the product is chilled to inhibit the growth of undesirable microflora.

When natural yogurt containing an active culture is consumed, some bacilli pass unharmed through the stomach, for these species favor an acid medium and therefore are not entirely destroyed by gastric juices. But when the bacilli find their way into the intestines, they may implant a favorable flora. In any event, whether or not an implant is effected, beneficial vitamins are ingested.

A high-quality natural yogurt is one which is low in fat and free of starch, the yogurt being rich in protein, calcium and other beneficial nutrients. Yogurt is believed to have medicinal value in the control of intestinal fermentation in that it contributes bacteria which establish themselves in the lower intestines and predominate over putrefactive types.

Because of a rising public demand for this healthful product, yogurt is now factory-produced on a large scale and widely sold in supermarkets. Yet while the benefits to be gained from yogurt cultures are recognized, not all brands of yogurt on the market include effective amounts of this culture. Indeed, in some brands, mainly those of the premixed or Swiss type, the cultures are often deactivated by the processing. Moreover, some commercially-produced yogurts contain preservatives and other additives of questionable value.

In order to make it feasible and inexpensive for a consumer to produce his own high-quality natural yogurt, yogurt makers are presently available on the market which are essentially constituted by a set of covered jars and an electrical heater therefor. In producing yogurt with a yogurt maker of this type, one requires only milk (whole or skimmed) and a yogurt starter in the form of a dried yogurt culture.

To make yogurt with this yogurt maker, one must first boil the milk and then allow it to cool until it reaches an acceptable temperature level, as measured by a thermometer, after which the starter powder is stirred into the hot milk. The mixture of heated milk and starter is then poured into the jars whose covers are screwed on. The covered jars are then placed in the electric heater which maintains the heated mixtures at the proper temperature for incubation, the heater being kept on for a prescribed number of hours until the yogurt is ready. Finally the jars are removed from the heater and placed in the refrigerator where they must be allowed to cool for several hours, so that the yogurt is thereafter ready for serving.

In this procedure, it is important that the milk being used not be too hot or the yogurt culture will be destroyed. On the other hand, if the culture is too cold it will not become active. It is essential, therefore, that a thermometer be used to determine when the temperature is exactly right for the yogurt starter to be added.

Clearly a yogurt maker of the above-described type involves a relatively elaborate procedure and requires that care be exercised to ensure the correct incubation temperature.

In an attempt to simplify the preparation of yogurt, the patents to Ferguson, U.S. Pat. Nos. 3,080,236, and Schur, 4,066,794, provide an instant yogurt preparation in dry form which when admixed with water at ordinary temperature gives rise to a yogurt-like product. But this product is not a natural yogurt, for the yogurt starter is not actually incubated but serves only to create a yogurt impression. Indeed, Ferguson characterizes his product as being "a synthetic yogurt composition." However, one advantage gained by the Ferguson and Schur procedures is that there is no need for liquid milk, and that one simply adds a dry yogurt preparation to water to produce a product resembling yogurt in taste and texture.

SUMMARY OF INVENTION

In view of the foregoing, the main object of this invention is to provide a yogurt maker which requires only hot water and a packaged yogurt preparation, the maker simplifying the yogurt-making procedure to produce a natural yogurt of high quality that is free of preservatives.

More particularly, it is an object of this invention to provide a yogurt maker which takes the form of a covered can having a removable Dewar flask or vacuum bottle therein that serves to maintain hot water intermixed with a yogurt composition at the desired temperature for the necessary incubation period without the need for externally-produced heat.

A significant feature of a yogurt maker in accordance with the invention is that the cover of the can housing the Dewar flask is provided with a chromatic liquid crystal temperature-responsive cell, making it possible to color-indicate the temperature of the hot tap water to be sure that it is at the proper level before it is poured into the flask. Another advantage of the invention is that the cover of the can also includes an incubation time scale to indicate the start and stop time of the incubation process.

Also an object of this invention is to provide a low-cost, efficient and reliable yogurt maker that is very simple to operate and requires no operating power.

Briefly stated, these objects are attained in a natural yogurt maker constituted by a cylindrical can having a removable cover adapted to accommodate a Dewar flask having a stopper, the cover having an encapsulated liquid crystal chromatic cell on the face thereof, which crystal is formulated to provide a predetermined color only when water poured thereover has the proper incubation temperature.

The rim of the cover is provided with a time scale readable with respect to start and stop points on the contiguous surface of the can. The points are spaced by the desired incubation interval so that when at the start of incubation at any given time, the scale is set to the start point to indicate this point in time, the operator then knows from the reading of the stop point on the scale when incubation will be completed.

The maker is usable with a yogurt-making preparation whose essential ingredients are powdered milk and yogurt starter; the composition being preferably packaged in a sealed envelope. To make yogurt, one simply empties the contents of the envelope into the flask, and after adjusting the temperature of the hot tap water with the liquid crystal cell to be sure that it is correct, one then pours the required amount of tap water into the flask. The flask is then sealed by its stopper and kept in the can until incubation is completed, after which the flask is withdrawn from the can and placed in a refrigerator for the required time.

OUTLINE OF DRAWINGS

For a better understanding of the invention as well as other objects and further features thereof, reference is made to the following detailed description to be read in conjunction with the accompanying drawings, wherein:

FIG. 1 illustrates in perspective a yogurt maker in accordance with the invention, the can and the cover being partly cut away;

FIG. 2 shows the cover of the can being used to determine the temperature of the hot tap water;

FIG. 3 shows a sealed envelope containing the yogurt preparation to be mixed into the hot tap water;

FIG. 4 shows the hot water being poured into the cartridge of the yogurt maker;

FIG. 5 shows the incubation time indicator on the maker;

FIG. 6 separately shows the cartridge;

FIG. 7 is a separate view of the stand for the cartridge; and

FIG. 8 is a plan view of the temperature indicator.

DESCRIPTION OF INVENTION

Referring now to FIG. 1, there is shown a yogurt maker in accordance with the invention, the maker including a cylindrical can 10 of metal or plastic material within which is nested a vacuum bottle of Dewar flask 11. This flask is constituted by outer and inner glass vessels 11A and 11B having an evacuated space 11C therebetween to minimize the loss of heat.

Received within vacuum bottle 11 is a cartridge 12 whose mouth is surrounded by an annular flange 13 having an externally threaded lower section 13A which threadably engages an internal ring 10A on the mouth of the can 10 and an upper collar section 13B adapted to receive a removable can cover 14. A stopper 15 is screwed into collar section 13B to seal the contents of the cartridge 12.

Removably attached to the bottom of cartridge 12 is a cylindrical plastic stand 16 having slots therein to form flexible spring fingers 16A so that when cartridge 12 is fitted into vacuum bottle 11, the stand fingers at the bottom of the bottle flex inwardly.

Cover 14 is provided on its face with an encapsulated liquid crystal cell 17 of the chromatic type that is responsive to heat and exhibits a color which depends on the temperature thereof. Cell 17 is preferably of the type disclosed by NCR Corporation in its booklet "Chameleon-Brand of Encapsulated Liquid Crystal" as well as in the references cited in this booklet. This cell makes use of thermally-sensitive compounds that are normally gray or colorless in appearance and change in color within a given temperature range from red at the lower end portion of the range through yellow and green to blue at the high end portion of the range.

Since in the present invention, it is essential that the hot water taken from a tap or other source be at a temperature of about 115° F. for proper incubation, the liquid crystal cell is one having a composition which at this specific temperature or at a temperature close thereto is indicated by, say, a green color. Thus when running hot water over the cover and adjusting the sink faucets which determine the ratio of hot and cold water, one knows that the running hot water temperature is acceptable only when the capsule turns green. Obviously, if the capsule turns red, the water is too cold; and if it turns to blue, it is too hot.

To enhance the readability of the cell 17, it is secured to the face of cover 14 by a clear disc 18 of plastic material, as shown in FIG. 8. The disc has a black intermediate ring 19 concentric with cell 17, the underside of the disc in the clear outer ring being bonded by a suitable adhesive to the cover. The black ring surrounding the cell provides a strong color contrast with the color of the cell.

As indicated in the NCR booklet, one can design the liquid crystal composition so that the blue to red color spectrum is related to a specified temperature range, and while by way of example we have indicated that the proper incubation temperature exists when the crystal turns green, in practice one can provide a crystal in which the proper incubation temperature is indicated by another color value, say, red or yellow. Thus the operator has no need to read digits or to examine the level of a mercury column on a scale as in conventional analog or digital thermometers, but simply look for a given color.

Printed or otherwise applied along the circular rim of cover 12 is a time scale 20 running in hours from 1 to 12, without any indication of AM or PM, or in a range of 0 to 24 to cover both AM and PM. Scale 20 is associated with a start point 21 and a stop point 22 on the upper end of can 11 which are spaced from each other by the incubation interval. Thus if the incubation period commences, say, at 2 o'clock (AM or PM), the operator turns cover 12 to align start point 21 with 2 on scale 20. The interval between start point 21 and stop point 22 is equal to the incubation period, usually 5 hours; hence in this example, stop point 22 is on "9" on the time scale, while start point 21 is on "4," which tells the operator that incubation will be completed at 9 o'clock, at which time he should remove the flask from the can and place it in a refrigerator.

The yogurt preparation is contained in a hermetically-sealed envelope 23 (as shown in FIG. 3). The ingredients are dry-blended and are packaged in this envelope, which is preferably a plastic-foil packet, heat-sealed to exclude air and moisture. So packaged, the preparation has an indefinite shelf life at ordinary room temperature.

The yogurt preparation is preferably constituted by powdered milk in a quantity appropriate to the volume of yogurt being prepared and a dried lactobacillus culture of a commercially-available type in which the bacilli are in a dormant state and are activated only when water is added thereto. The powdered milk is preferably in a form in which it is almost immediately soluble. For this purpose, dried skimmed milk may be used which has been dehydrated to form a concentrated liquid which is then subjected to spray drying to aerate the milk powder to thereby render it more quickly soluble. Alternatively, the milk may be of the freeze-dried type to retain fat and other natural constituents.

Milk solids and dried yogurt culture are "hard-to-wet" in the sense this term is used by food technologists; for the particles of these substances are too fine to break the surface tension of the liquid and the particles have some oil or fat on their surface which naturally repel water molecules. In practice, an anionic wetting agent such as dioctyl sodium sulfosuccinate (DSS) may be added. This wetting agent acts to enhance dispersion by reducing the interfacial tension between the oil/water interface to very low levels. Because of the improved dispersion of the dried yogurt culture and its distribution throughout the milk, incubation is accelerated and the period thereof is shortened.

One may also add a flavoring agent such as Givaudan R which simulates strawberry taste. This is, of course, optional; for one may produce a natural yogurt preparation to which is later added natural fruit. Where a simulated fruit flavoring agent is used, one also should use a coloring agent such as Red 40 in the case of strawberry to give the yogurt the color appropriate to the fruit flavor.

The yogurt-making procedure is altogether uncomplicated; for all that need be done is to rupture envelope 23 and empty its contents into cartridge 12. Then one runs hot water under cover 14 and adjusts the hot and cold water faucets until the temperature, as indicated by the color of liquid crystal cell 17, is at the proper incubation level. The hot water is then poured into the flask. The flask contents are then stirred to ensure proper dispersion of the powder. Finally, stopper 15 is screwed onto the cartridge which acts to maintain the existing temperature of the contents for a prolonged period.

Cover 15 is then turned to indicate the start point of incubation on the scale. At the completion of incubation, as indicated by the stop point, the cartridge is screwed out of the can and chilled in a refrigerator for a few hours, the yogurt thereafter being in condition to be served. The yogurt in the flask may be refrigerated for several weeks without spoiling.

While there has been shown and described a preferred embodiment of a yogurt maker in accordance with the invention, it will be appreciated that many changes and modifications may be made therein without, however, departing from the essential spirit thereof. For example, instead of a vacuum bottle, one may provide other forms of thermal insulation such as polyurethane foam.

For example, in practice, instead of a dried yogurt preparation, one can use a liquid yogurt starter with the maker. Also, while only start and stop pointers are shown on the upper end of the can in association with the graduated time scale on the cover, in practice one can apply to the can, in addition to a start pointer, a series of spaced pointers corresponding to different periods of time. Thus a first pointer in the series may be applied at a position displaced, say, three hours from the start pointer to provide a "Mild" yogurt, with a second pointer displaced four hours from the start pointer to produce a "Regular" yogurt, and a third pointer displaced five and a half hours from the start pointer to provide a "Tart" yogurt. In this way, the operator, using the time scale in conjunction with this series of pointers, can maintain incubation for a time period appropriate to the type or strength of yogurt he wishes to produce.

I claim:

1. A yogurt maker which requires hot water at a predetermined temperature level and a yogurt milk preparation having bacilli therein to effect incubation when the preparation is mixed with said hot water to produce natural yogurt after a predetermined period, said maker comprising:
   (A) a can provided with a thermal insulation liner, said can having a rotatable cover; and
   (B) a cartridge receivable within the insulated can and having a removable stopper, said preparation being mixed in said cartridge with said hot water to provide a latent yogurt composition, said cover having a liquid crystal chromatic cell thereon whose surface is exposed to hot water poured over the cover to test said water before it is poured into said cartridge to be sure that its temperature as indicated by the color of the cell is at the desired level, said cell turning a predetermined color only when the temperature is at the correct incubation temperature, said cartridge upon completion of incubation being removable from said can and being storable in a refrigerator.

2. A yogurt maker as set forth in claim 1, wherein said cartridge is provided with a removable stand which clamps onto the bottom of the cartridge, making it possible to store said cartridge in the refrigerator in an erect position.

3. A yogurt maker as set forth in claim 1, wherein said thermal insulation liner is constituted by a Dewar flask having inner and outer vessels with a vacuum therebetween.

4. A yogurt maker as set forth in claim 1, wherein said preparation is packaged in a hermetically-sealed rupturable envelope.

5. A yogurt maker as set forth in claim 4, wherein said preparation is composed of powdered milk and a dried lactobacillus culture.

6. A yogurt maker as set forth in claim 5, wherein said preparation further includes a wetting agent to improve the dispersion thereof in water.

7. A yogurt maker as set forth in claim 6, wherein said preparation further includes a flavoring agent.

8. A yogurt maker as set forth in claim 1, wherein said cell is responsive to a temperature gradient to produce a color spectrum from red through yellow and green through blue.

9. A yogurt maker as set forth in claim 1, wherein said cover has an incubation time scale on its rim which is rotatable relative to a point on said can.

* * * * *